United States Patent
Iannelli

(10) Patent No.: US 7,848,661 B2
(45) Date of Patent: *Dec. 7, 2010

(54) DIRECTLY MODULATED LASER OPTICAL TRANSMISSION SYSTEM WITH PHASE MODULATION

(75) Inventor: John Iannelli, San Marino, CA (US)

(73) Assignee: Emcore Corporation, Albuquerque, NM (US)

(*) Notice: Subject to any disclaimer, the term of this patent is extended or adjusted under 35 U.S.C. 154(b) by 1292 days.

This patent is subject to a terminal disclaimer.

(21) Appl. No.: 11/366,936

(22) Filed: Mar. 2, 2006

(65) Prior Publication Data

US 2006/0210282 A1 Sep. 21, 2006

Related U.S. Application Data

(63) Continuation-in-part of application No. 11/080,721, filed on Mar. 15, 2005, now Pat. No. 7,466,925.

(51) Int. Cl.
*H04B 10/04* (2006.01)

(52) U.S. Cl. .................. 398/197; 398/186; 398/192

(58) Field of Classification Search .......... 398/182–201
See application file for complete search history.

(56) References Cited

U.S. PATENT DOCUMENTS

| | | |
|---|---|---|
| 3,794,841 A | 2/1974 | Cosentino et al. |
| 4,156,206 A | 5/1979 | Comerford et al. |
| 4,466,694 A | 8/1984 | MacDonald |
| 4,704,720 A | 11/1987 | Yamaguchi |
| 4,786,132 A | 11/1988 | Gordon |
| 4,992,754 A | 2/1991 | Blauvelt et al. |
| 5,003,546 A | 3/1991 | Lidgard et al. |
| 5,132,639 A | 7/1992 | Blauvelt et al. |
| 5,161,044 A | 11/1992 | Nazarathy et al. |
| 5,172,068 A | 12/1992 | Childs |
| 5,227,736 A | 7/1993 | Tucker et al. |
| 5,252,930 A | 10/1993 | Blauvelt |
| 5,257,124 A | 10/1993 | Glaab et al. |
| 5,303,079 A | 4/1994 | Gnauck |
| 5,325,225 A | 6/1994 | Suzaki et al. |
| 5,424,680 A | 6/1995 | Nazarathy et al. |
| 5,430,569 A | 7/1995 | Blauvelt et al. |
| 5,436,749 A | 7/1995 | Pidgeon, Jr. et al. |

(Continued)

FOREIGN PATENT DOCUMENTS

JP  2002-317451  10/2002

OTHER PUBLICATIONS

Anonymous (2006), "Electro-optic modulator," located at <http://en.wikipedia.org/wiki/Electro-optic_modulator>, last visited on Feb. 24, 2009.

(Continued)

*Primary Examiner*—Dzung D Tran

(57) ABSTRACT

An optical transmitter for generating a modulated optical signal for transmission over a fiber optic link to a remote receiver including a laser; an input coupled to the laser for directly amplitude modulating the laser with an analog RF signal to produce an output optical signal including an amplitude modulated information-containing component; and a phase modulator coupled to the output of the laser for reducing the distortion present in the received optical signal at the remote receiver.

21 Claims, 6 Drawing Sheets

U.S. PATENT DOCUMENTS

| | | | |
|---|---|---|---|
| 5,453,867 A | 9/1995 | Ohya et al. | |
| 5,453,868 A * | 9/1995 | Blauvelt et al. | 398/199 |
| 5,485,481 A | 1/1996 | Ventrudo et al. | |
| 5,500,758 A * | 3/1996 | Thompson et al. | 398/202 |
| 5,524,076 A | 6/1996 | Rolland | |
| 5,546,281 A | 8/1996 | Poplawski et al. | |
| 5,663,823 A | 9/1997 | Suzuki et al. | |
| 5,699,179 A | 12/1997 | Gopalakrishnan | |
| 5,717,533 A | 2/1998 | Poplawski et al. | |
| 5,717,804 A | 2/1998 | Pan et al. | |
| 5,778,113 A | 7/1998 | Yu | |
| 5,798,854 A | 8/1998 | Blauvelt et al. | |
| 5,812,294 A | 9/1998 | Wilson | |
| 5,812,716 A | 9/1998 | Ohishi | |
| 5,828,477 A * | 10/1998 | Nilsson et al. | 398/185 |
| 5,845,030 A | 12/1998 | Sasaki et al. | |
| 5,850,305 A | 12/1998 | Pidgeon | |
| 5,870,417 A | 2/1999 | Verdiell et al. | |
| 5,917,642 A | 6/1999 | O'Donnell | |
| 5,991,471 A | 11/1999 | Yu | |
| 6,002,816 A | 12/1999 | Penninck | |
| 6,078,418 A | 6/2000 | Hansen | |
| 6,091,864 A | 7/2000 | Hofmeister | |
| RE36,820 E | 8/2000 | McGinley et al. | |
| 6,104,851 A | 8/2000 | Mahgerefteh | |
| 6,122,085 A | 9/2000 | Bitler | |
| 6,179,627 B1 | 1/2001 | Daly et al. | |
| 6,207,950 B1 | 3/2001 | Verdiell | |
| 6,220,873 B1 | 4/2001 | Samela et al. | |
| 6,246,965 B1 | 6/2001 | Cockerham et al. | |
| 6,252,693 B1 * | 6/2001 | Blauvelt | 398/194 |
| 6,288,814 B1 | 9/2001 | Blauvelt | |
| 6,304,353 B1 | 10/2001 | Gehlot | |
| 6,356,679 B1 | 3/2002 | Kapany | |
| 6,363,187 B1 | 3/2002 | Fells | |
| 6,373,644 B1 | 4/2002 | Flanders | |
| 6,416,937 B1 | 7/2002 | Flanders et al. | |
| 6,446,867 B1 | 9/2002 | Sanchez | |
| 6,480,513 B1 | 11/2002 | Kapany et al. | |
| 6,501,867 B2 | 12/2002 | Gates, II | |
| 6,517,382 B2 | 2/2003 | Flickinger et al. | |
| 6,519,270 B1 * | 2/2003 | Kim et al. | 372/28 |
| 6,519,374 B1 | 2/2003 | Stook | |
| 6,535,315 B1 | 3/2003 | Way et al. | |
| 6,538,789 B2 | 3/2003 | Sun | |
| 6,650,458 B1 | 11/2003 | Prosyk | |
| 6,654,564 B1 | 11/2003 | Colbourne | |
| 6,661,814 B1 | 12/2003 | Chapman et al. | |
| 6,661,815 B1 | 12/2003 | Kozlovsky et al. | |
| 6,741,761 B2 | 5/2004 | Sharp | |
| 6,760,142 B2 | 7/2004 | Leuthold et al. | |
| 6,795,595 B2 | 9/2004 | Gopalakrishnan | |
| 6,832,050 B1 | 12/2004 | Clausen | |
| 6,856,770 B2 | 2/2005 | Bai | |
| 6,864,414 B2 | 3/2005 | Sharps et al. | |
| 6,941,045 B2 | 9/2005 | Doerr | |
| 6,961,492 B2 | 11/2005 | Doerr | |
| 6,963,685 B2 | 11/2005 | Mahgerefteh | |
| 7,058,314 B1 | 6/2006 | Clausen | |
| 7,071,407 B2 | 7/2006 | Faterni et al. | |
| 7,088,875 B2 | 8/2006 | Sugiyama | |
| 7,099,597 B2 | 8/2006 | Saunders | |
| 7,115,811 B2 | 10/2006 | Ho et al. | |
| 7,116,913 B2 | 10/2006 | Miyauchi | |
| 7,170,914 B2 | 1/2007 | Narayan | |
| 7,171,076 B2 | 1/2007 | Shibata | |
| 2001/0015843 A1 | 8/2001 | Miyauchi | |
| 2002/0005970 A1 | 1/2002 | Lang | |
| 2002/0039217 A1 | 4/2002 | Saunders | |
| 2002/0171894 A1 | 11/2002 | Sun | |
| 2003/0002112 A1 | 1/2003 | Hirano | |
| 2003/0016415 A1 | 1/2003 | Jun et al. | |
| 2003/0185573 A1 | 10/2003 | Fells | |
| 2004/0076199 A1 | 4/2004 | Wipiejewski et al. | |
| 2005/0025500 A1 | 2/2005 | Hallemeier | |
| 2005/0036792 A1 * | 2/2005 | Frederiksen et al. | 398/193 |
| 2005/0069329 A1 * | 3/2005 | Giles et al. | 398/188 |
| 2005/0220458 A1 * | 10/2005 | Kupershmidt et al. | 398/196 |
| 2005/0271396 A1 | 12/2005 | Iannelli | |
| 2005/0281298 A1 | 12/2005 | Kupershmidt et al. | |
| 2006/0078336 A1 | 4/2006 | McNicol | |
| 2006/0109877 A1 * | 5/2006 | Caton et al. | 372/33 |
| 2007/0098414 A1 | 5/2007 | Zhou | |

OTHER PUBLICATIONS

Anonymous (2006), "General Photonics Corporation—LiNbO3 Phase Modulator," located at <http://www.generalphotonics.com/GP%20Modulator.htm>, last visited on Feb. 24, 2009.

Dye, S. (Nov.-Dec. 1995). "Mach-Zehnder External Modulator Linearization Techniques," International Journal of Optoelectronics 10(6):455-459.

Griffin, R.A. et al. (1999), "Radio-Over-Fiber Distribution Using an Optical Millimeter-Wave/DWDM Overlay," Optical Fiber Communication Conference, 1999, and the International Conference on Integrated Optics and Optical Fiber Communication. CFC/OOC '99, San Diego, CA, Feb. 21-26, 1999, 2:WD6-1-WD6-3.

R.G. Harrison and D. Yu, "Stimulated Brillouin Scattering", Chapter 0.1, R. Pike and P. Sabatier, eds., Scattering: Scattering and Inverse Scattering in Pure and Applied Science, © 2001, Academic Press, pp. 1-11.

R. Wyatt, W.J. Devlin, "10 kHz Linewidth 1.5μm InGaAsP External Cavity Laser with 55nm Tuning Range", Electronic Letters, vol. 19, pp. 110-112, 1983.

D.M. Bird et al, "Narrow Line Semiconductor Laser Using Fibre Grating", Electronics Letters, vol. 27, Issue 13, pp. 1115-1116, Jun. 20, 1991.

M. Ziari et al., "High-Speed Fiber-Grating-Coupled Semiconductor Wavelength-Division Multiplexed Laser", CLEO '97, paper CMGI, May 20-22, 1997, Baltimore, MD, p. 27.

M.S. Whalen et al., "Tunable Fibre-Extended-Cavity Laser", Electronics Letters, vol. 23, No. 7, pp. 313-314, Mar. 1987.

C.A. Park et al., "Single-Mode Behavior of a Multimode 1.55 μm Laser With a Fire Grating External Cavity", Electronics Letters, vol. 22, No. 21, pp. 1132-1133, Oct. 9, 1986.

E.E. Bergmann et al., "Dispersion-Induced Composite Second-Order Distortion at 1.5 μm", IEEE Photonics Technology Letters, vol. 3, No. 1, pp. 59-61, Jan. 1991.

C.Y Kuo and E.E. Bergmann, "Erbium-Doped Fiber Amplifier Second-Order Distortion in Analog Links and Electronic Compensation", IEEE Photonics Technology Letters, vol. 3, No. 9, pp. 829-831, Sep. 1991.

C.Y. Kuo, "Fundamental Second-Order Nonlinear Distortions in Analog AM CATV Transport Systems Based on Single Frequency Semiconductor Lasers", Journal of Lightwave Technology, vol. 10, No. 2, pp. 235-243, Feb. 1992.

R. Nagarajan et al., "Millimeter Wave Narrowband Optical Fiber Links Using External Cavity Semiconductor Lasers", Journal of Lightwave Technology, vol. 12, No. 1, pp. 127-136, Jan. 1994.

L. A. Coldren and T. L. Koch, "External-Cavity Laser Design", Journal of Lightwave Technology, vol. LT-2, No. 6, pp. 1045-1051, Dec. 1984.

A. Lidgard and N. A. Olsson, "Generation and Cancellation of Second-Order Harmonic Distortion in Analog Optical Systems by Interferometric FM-AM Conversion", IEEE Photonics Technology Letters, vol. 2, No. 7, pp. 519-521, Jul. 1990.

T. E. Darcie et al., "Fiber-Reflection-Induced Impairments in Lightwave AM-VSB CATV Systems", Journal of Lightwave Technology, vol. 9, No. 8, pp. 991-995. Aug. 1991.

V. Sykes, "External-Cavity Diode Lasers for Ultra-Dense WDM Networks", Lightwave, Mar. 2001.

Agrawal, Fiber-Optic Communication Systems, 2nd ed., pp. 39-63, 138-154, 163-175, 244-251, 261-271, and 441-447; New York: John Wiley & Sons, Inc. (1997).

Agrawal, *Nonlinear Fiber Optics*, pp. 51-83, 180-185, 263-273, and 283-286; San Diego, CA: Academic Press (1989).

Aoki et al., "Input Power Limits of Single Mode Optical Fibers Due to Stimulated Brillouin Scattering in Optical Communications Systems", *J. Lightwave Technol.*, 6(5):710-719 (1988).

Bertelsmeier et al., "Linearization of Broadband Optical Transmission Systems by Adaptive Predistortion", *Frequenz*, 38(9):206-212 (1984).

Bolle et al., "Brillouin Gain Curve Dependence on Frequency Spectrum of PSK-modulated Signals", *Electronics Lett.*, 25(1):2-3 (1989).

Bolle et al., "Influence of phase modulation on the Brillouin gain curve", *Proceedings of the 24th European Conference on Optical Communication*, pp. 119-122 (1988).

Bose et al., *Introductory Network Theory*, New York: Harper & Row, Weatherhill, pp. 176-187 (1965).

Chou et al., "Single-tone and two-tone AM-FM spectral calculations for tunable diode laser absorption spectroscopy", *Appl. Opt.*, 26(17):3584-3587 (1987).

Chraplyvy, "Limitations on Lightwave Communications Imposed by Optical-Fiber Nonlinearities", *J. Lightwave Technol.*, 8(10):1548-1557 (1990).

Cotter, "Observation of Stimulated Brillouin Scattering in Low-loss Silica Fibre at 1.3µm", *Electronics Lett.*, 18(12):495-496 (1982).

Cotter, "Suppression of Stimulated Brillouin Scattering During Transmission of High-Power Narrowband Laser Light in Monomode Fibre", *Electronics Lett.*, 18(15):638-640 (1982).

Cotter, "Transient Stimulated Brillouin Scattering in Long Single-Mode Fibres", *Electronics Lett.*, 18(12):504-508 (1982).

Davis et al., "Scheme for Negating the Stimulated Brillouin Scattering Power Limit in Remotely Interrogated Interferometric Fiber Sensor Arrays", *Proceedings of the SPIE*, 2071:112-119 (1993).

Dixit, "Numerical Modeling of Suppression of Stimulated Brillouin Scattering Due to Finite Laser Bandwidth", *Proc. of the SPIE*, 1626:254-265 (1992).

Eskildsen et al., "Stimulated Brillouin scattering suppression with low residual AM using a novel temperature wavelength-dithered DFB laser diode", *Electronics Lett.*, 32(15):1387-1389 (1996).

*Analog Devices Design-In Reference Manual* showing 250MHz, Voltage Output 4-Quadrant Multiplier (3 pp.) (1994).

Fishman et al., "Degradations Due to Stimulated Brillouin Scattering in Multigigabit Intensity-Modulated Fiber-Optic Systems", *J. Lightwave Technol.*, 11(11):1721-1728 (1993).

Fishman et al., "Transmitter and Receiver Design for Amplified Lightwave Systems", Chapter 3 IN: Kaminow et al. (eds.), *Optical Fiber Telecommunications IIIB*, San Diego, CA: Academic Press, pp. 69-94, 117-126, 377-420 (1997).

Gilbert, "A Precise Four-Quadrant Multiplier with Subnanosecond Response", *IEEE J. Solid-State Circuits*, 3(4):365-373 (1968).

International Search Report mailed Dec. 16, 2008, for PCT Application No. PCT/US2008/005547 (6 pp).

Kartalopoulos, *DWDM Networks, Devices and Technology*, IEEE Press, pp. 77, 105, 110, 125, 129, 154, 172-186, and 306-307 (2003).

Labudde et al., "Transmission of Narrow Band High Power Laser Radiation Through Optical Fibers", *Opt. Comm.*, 32(3):385-390 (1980).

Lotem, "Extension of the Spectral Coverage Range of Frequency Modulation Spectroscopy by Double Frequency Modulation", *J. Appl. Phys.*, 54(10):6033-6035 (1983).

Mao et al., "Brillouin scattering in externally modulated lightwave AM-VSB CATV transmission systems", *IEEE Photon. Technol. Lett.*, 4(3):287-289 (1992).

Milburn et al., "Optical-fiber media for squeezed-state generation", *J. Opt. Soc. Am. B.*, 4(10):1476-1489 (1987).

Muys et al., "A 50-channel externally modulated AM-VSB video distribution system with three cascaded EDFA's providing 50-dB power budget over 30 km of standard single-mode fiber", *IEEE Photon. Technol. Lett.*, 7(6):691-693 (1995).

Nilsson, *Electric Circuits*, 4th ed., Addison-Wesley Publishing Co., pp. 372-388 (1993).

Non-final office action from U.S. Appl. No. 11/701,742, mailed Sep. 15, 2009.

Non-final office action from U.S. Appl. No. 11/729,255, mailed Sep. 17, 2009.

Pavesi et al., "Role of Point Defects in the Silicon Diffusion in GaAs and Al(0.3)Ga(0.7)As and in the Related Superlattice Disordering", *J. Appl. Phys.*, 71(5):2225-2237 (1992).

Ramaswami et al. (eds.), *Optical Networks: A Practical Perspective*, 2nd ed., San Diego, CA: Academic Press, pp. 76-90, 186-197 (2002).

Senturia et al., *Electronic Circuits and Applications*, New York: Wiley and Sons, pp. 471-497 and 549-573 (1975).

Smith, "Optical Power Handling Capacity of Low Loss Optical Fibers as Determined by Stimulated Raman and Brillouin Scattering," *Appl. Opt.*, 11(11):2489-2494 (1972).

Stolen, "Nonlinearity in Fiber Transmission", *Proc. of the IEEE*, 68(10):1232-1236 (1980).

Sugie et al., "A Novel Repeaterless CPFSK Coherent Lightwave System Employing an Optical Booster Amplifier", *J. Lightwave Technol.*, 9(9):1178-1186 (1991).

Sugie, "Suppression of SBS by discontinuous Brillouin frequency shifted fibre in CPFSK coherent lightwave system with booster amplifier", *Electronics Lett.*, 27(14):1231-1233 (1991).

Thomas et al., "Normal Acoustic Modes and Brillouin Scattering on Single-Mode Optical Fibers", *Phys. Rev. B*, 19(10):4986-4998 (1979).

Wedlock et al., *Electronic Components and Measurements*, Englewood Cliffs, NJ: Prentice-Hall Inc., pp. 225-239 (1969).

Yariv, *Optical Communications in Modern Communications*, 5th ed., The Oxford Series in Electrical and Computer Engineering, Oxford University Press, pp. 294-344 (1997).

Yariv, *Optical Electronics*, 3rd ed., New York: Holt, Rinehart and Winston (1985).

Yu et al., "A Model of Si Diffusion in GaAs Based on the Effect of the Fermi Level", *J. Appl. Phys.*, 66(7):2952-2961 (1989).

Final Office Action from U.S. Appl. No. 11/701,742 mailed Mar. 17, 2010.

Non-Final Office Action from U.S. Appl. No. 11/701,742 mailed May 27, 2010.

Final Office Action from U.S. Appl. No. 11/729,255 mailed Mar. 17, 2010.

\* cited by examiner

Test Condition: CSO was tested with 72 NTSC Channels from 115.25MHz to 547.875MHz over 65km SMF-28 fiber at 17dBm optical launching power and 0dBm receiving power

DIRECTLY MODULATED LASER OPTICAL TRANSMISSION SYSTEM WITH PHASE MODULATION

REFERENCE TO RELATED APPLICATION(S)

This application is a continuation-in-part of U.S. patent application Ser. No. 11/080,721, filed Mar. 15, 2005.

This application is also related to U.S. patent application Ser. No. 10/946,056 filed Sep. 21, 2004, and assigned to the common assignee.

BACKGROUND OF THE INVENTION

1. Field of the Invention

This invention relates to an optical transmission system for analog signals, and in particular to a directly modulated solid-state laser. More particularly, the invention relates to the cancellation of phase modulated components arising from chirp in the semiconductor laser, which has its output distorted from its directly modulated input due to inherent nonlinearity in the laser.

2. Description of the Related Art

Directly modulating the analog intensity of a light-emitting diode (LED) or semiconductor laser with an electrical signal is considered among the simplest methods known in the art for transmitting analog signals, such as voice and video signals, on optical fibers. Although such analog transmission techniques have the advantage of substantially smaller bandwidth requirements than digital transmission, such as digital pulse code modulation, or analog or pulse frequency modulation, the use of amplitude modulation may suffer from noise and nonlinearity of the optical source.

For that reason, direct modulation techniques have been used in connection with 1310 nm lasers where the application is to short transmission links that employ fiber optic links with zero dispersion. For applications in metro and long haul fiber transmission links, the group velocity dispersion of the link requires that externally modulated 1550 nm lasers be used, but such external modulation techniques are complex and expensive. The present invention is therefore addressed to the problem of providing a simple and low cost system for direct modulation of a laser at 1550 nm so that the analog optical output can be used in metro and long haul optical networks using analog transmission while avoiding the detrimental effects of dispersion.

Direct current modulation of lasers is known for use in digital optical transmission systems such as dense wavelength division multiplexing (DWDM) systems. See, for example, Kartalopoulos, DWDM Networks, Devices, and Technology (IEEE Press, 2003), p. 154.

One of the difficulties in designing an analog system at 1550 nm is that suitable low chirp linear lasers for use at 1550 nm are not known in the prior art. One type of low chirp laser is the external cavity laser, which is used in digital optical transmission systems, and is a commercially available product.

In addition to the low chirp characteristics required for an analog optical transmission system at 1550 nm, the system must be highly linear. Distortion inherent in certain analog transmitters prevents a linear electrical modulation signal from being converted linearly to an optical signal, and instead causes the signal to become distorted. These effects are particularly detrimental to multi-channel video transmission, which requires excellent linearity to prevent channels from interfering with each other. A highly linearized analog optical system has wide application in commercial analog systems, such as broadcast TV transmission, CATV, interactive TV, and video telephone transmission.

Linearization of optical and other nonlinear transmitters has been studied for some time, but proposed solutions suffer from practical disadvantages. Most applications discussed above have bandwidths which are too large for many practical implementations. Feedforward techniques require complex system components such as optical power combiners and multiple optical sources. Quasi-optical feedforward techniques suffer from similar complexity problems and further require extremely well matched parts.

As noted above, external modulators are known for use in optical transmission systems in the prior art. U.S. Pat. No. 5,699,179 describes an externally modulated, feed-forward linearized analog optical transmitter for reducing the fiber-induced composite second order (CSO) distortion components.

Prior to the present invention, there has not been an application of an external modulator coupled to a directly (current) modulated laser for the purpose of cancelling phase modulated components arising from chirp in the external cavity laser.

SUMMARY OF THE INVENTION

1. Objects of the Invention

It is an object of the present to provide an improved optical transmission system using a directly modulated laser.

It is another object of the present invention to compensate for the chirp in a laser used in a 1550 nm analog optical transmission system.

It is also another object of the present invention to provide a phase modulator for use in a 1550 nm analog optical transmission system to improve noise reduction.

It is still another object of the present invention to provide a low chirp, highly linear analog optical transmission system suitable for long haul dispersive optical fiber media using a directly modulated laser with a phase modulator.

It is still another object of the present invention to provide a phase shifting circuit for modulating a low chirp laser in an analog optical transmission system suitable for long haul dispersive optical fiber media.

It is also an object of the present invention to provide a direct modulation and phase distortion compensation process in a broadband analog optical transmission system.

Some implementations or embodiments may achieve fewer than all of the foregoing objects.

2. Features of the Invention

Briefly, and in general terms, the present invention provides an optical transmitter for generating a modulated optical signal for transmission over a dispersive fiber optic link to a remote receiver having an input for receiving a broadband analog radio frequency signal input; a semiconductor laser for producing an optical signal; and a modulation circuit for directly modulating the laser with the analog signal, including an optical phase modulator for reducing the distortion in the signal present at the receiver end of the fiber optic link due to phase modulation components.

In another aspect, the present invention provides an optical transmission system for use over dispersive fiber optic links including an optical transmitter with analog signal input; a low chirp laser; a modulation circuit for directly modulating the laser, and an attenuation and phase shifting circuit for canceling phase modulation components of the optical signal generated by the semiconductor laser.

In another aspect, the present invention further provides a low-cost direct modulation technique, preferably including a circuit for controlling an optical phase modulator reducing second and higher even order distortion products produced by a nonlinear device such as a laser.

In another aspect of the invention, the present invention provides a low chirp laser as an external cavity laser operating in the 1530 nm to 1570 nm range in the "C band" with an external phase modulator.

In another aspect of the invention, there is provided a chirp cancellation circuit for reducing distortion in the transmission of analog signals that splits an input RF modulation signal into two electrical paths, one primary and one secondary. The phase modulation cancellation signal is adjusted in amplitude and phase to match the frequency or phase dependence of the chirp by the nonlinear device. The phase of the signals are synchronized by a delay or phase adjustment element in one of the electrical paths. The primary and secondary signals are then recombined by the optical phase modulator to produce a single modulation signal having only amplitude modulation. Thus, the phase modulator linearizes the transmission of the optical signal by canceling phase component distortion inherent in nonlinear transmitting devices, making the analog signals suitable for transmission over dispersive fiber optic links. We refer to this configuration and technique as post phase correction (PPC).

Additional objects, advantages and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1A:
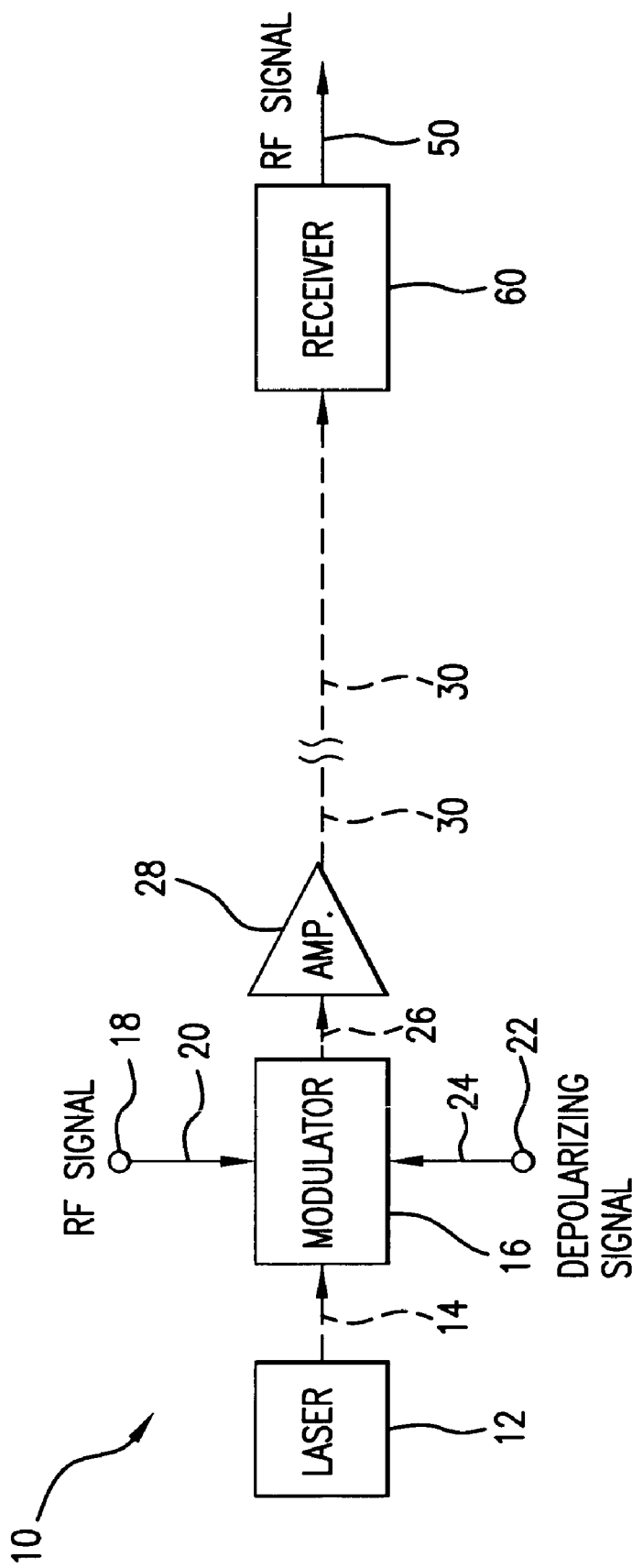
FIG. 1(a) is a highly simplified block diagram of an externally modulated optical transmission system as known in the prior art.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawn to scale.

FIG. 1(a) is block diagram of a prior art optical transmitter as represented in U.S. Pat. No. 5,699,179 utilizing an external modulator. The transmitter, shown generally at 10, transmits an optical signal to a receiver 60 over an optical fiber path 30. The transmitter 10 includes a semiconductor laser 12, which produces a continuous wave (CW) output. Typical examples of such lasers are distributed feedback (DFB) lasers or Fabry-Perot lasers that produce an output optical beam at a wavelength of 1,550 nm. The un-modulated optical signal from the laser is coupled to a modulator 16 by optical fiber 14. The modulator 16 may be a single modulator such as a Mach-Zehnder modulator, a cascaded MZ modulator or more than one modulator such as in a feed-forward linearizer. The modulator 16 also receives, via terminal 18 and line 20, a broadband RF signal such as an amplitude modulated vestigial sideband (AM-SDB) cable television (CATV) or video signal. Moreover, when a feed-forward linearizer is used, a depolarizing signal is provided to the modulator 16 via terminal 22 and line 24. The depolarizing signal is used to depolarize the optical input to an error-correcting modulator (not shown) in the modulator 16.

The modulated optical signal which carries the video data is coupled by a fiber link 26 to an amplifier 28. The amplifier 28 is typically an erbium doped fiber amplifier (EDFA). The amplified optical signal is coupled to a fiber optical transmission line 30 to the receiver 60. The optical fiber transmission line 30 may be a long-distance link extending over several kilometers. In this case, line amplifiers such as EDFA 28 may be provided at spaced intervals along in the line in order to boost the signal to desired levels. At the receiver 60, an amplifier (not shown) may also be provided to boost the incoming optical signal. The boosted signal is then applied to a photodetector and demodulated at the receiver 60 to an electrical signal, which represents the original video or data signal at line 50.

Figure 1B:
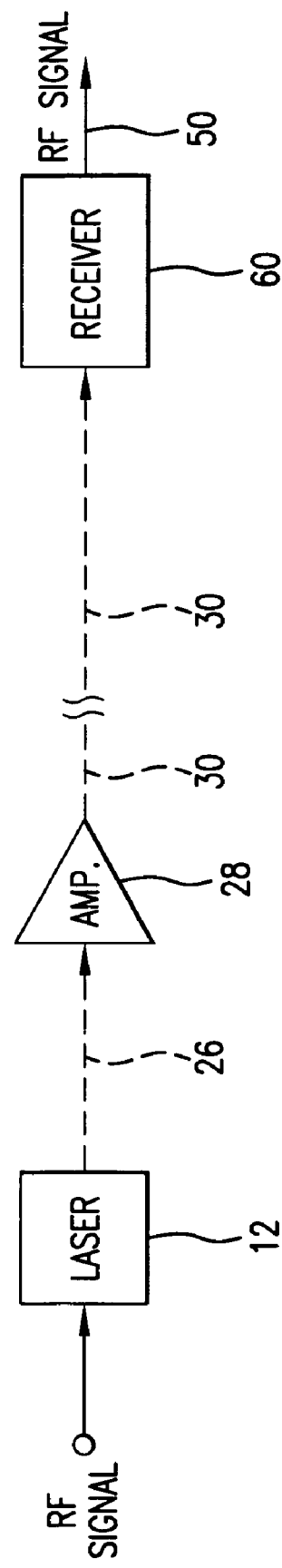
FIG. 1(b) is a highly simplified block diagram of a directly modulated optical transmission system as known in the prior art.

FIG. 1(b) is a block diagram of a prior art optical transmitter utilizing direct current modulation of the laser. The broadband RF analog signal is applied directly to the laser 12. The modulated optical signal from the laser 12 is coupled by a fiber link 26 to an amplifier 28, such as an EDFA. The amplified optical signal is coupled to a fiber transmission line 30 to the receiver 60. At the receiver, the optical signal is converted to an electrical signal, representing the original video or data signal at line 50.

Figure 2:
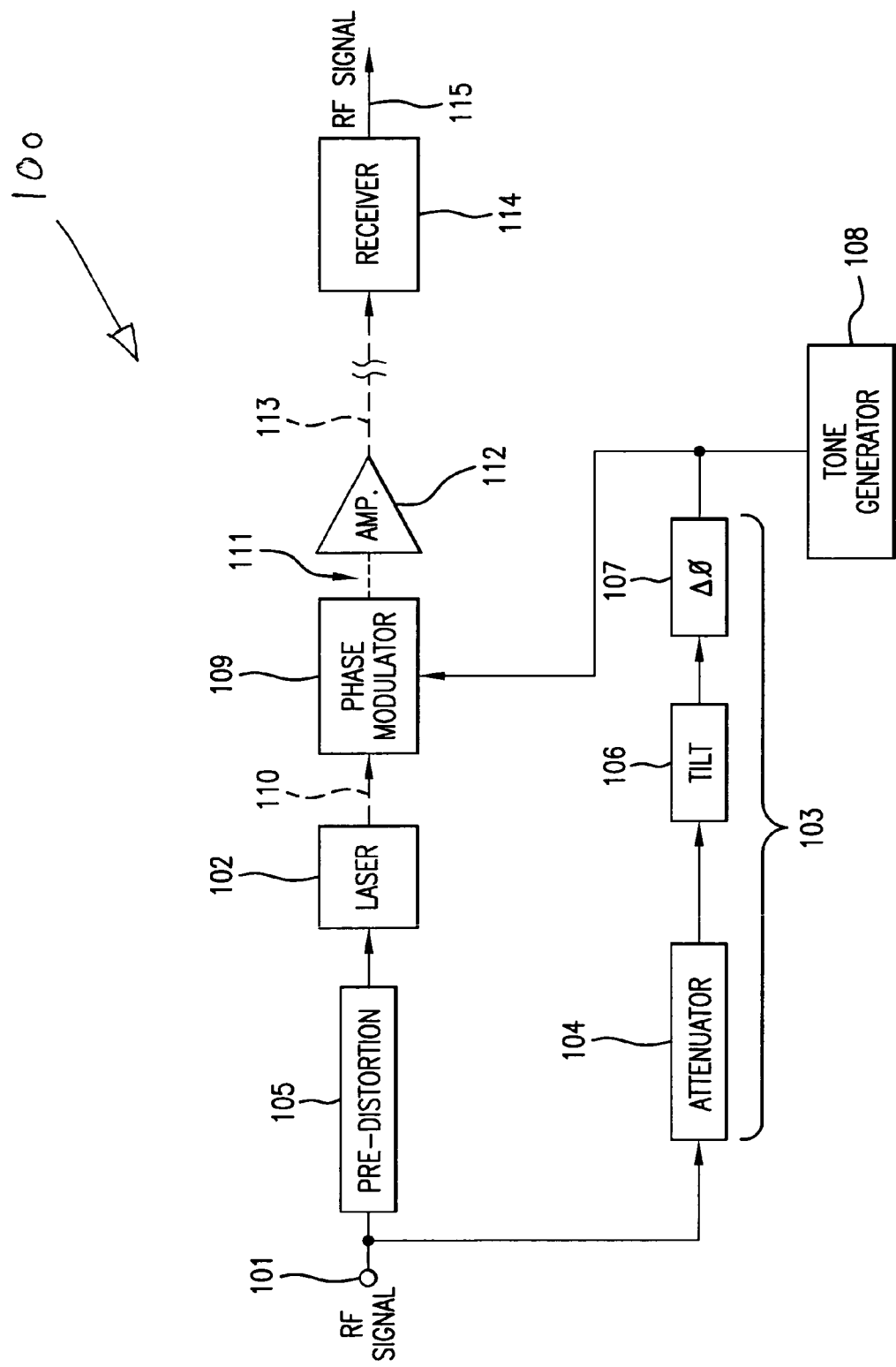
FIG. 2 is a highly simplified block diagram of the optical transmission system according to the present invention.

FIG. 2 is a highly simplified block diagram of the optical transmission system 100 according to the present invention. There is shown an analog RF signal input source 101, such as a broadband signal including a plurality of distinct information-containing communications signals or channels. The modulation circuit of the laser 102 in the present invention may be an AM-VSB modulator, or a quadrature amplitude modulator. The RF input is split into two parts; one part is applied to the laser 102 to directly modulate it; the other part is applied to RF conditioning circuitry 103. The output of the RF conditioning circuitry 103 is applied to a phase modulator. The optical fiber output 113 is a dispersive fiber optic link.

The edge-emitting semiconductor laser used in the system of FIG. 2 is preferably a distributed feedback laser (DFB), although a Fabry-Perot (FP) laser may be used as well.

In an embodiment, the laser is an external cavity laser and the wavelength of the light output by the laser is in the 1530 to 1570 nm range. Moreover, the broadband analog signal input has a bandwidth greater than one octave and includes a plurality of distinct information carrying channels.

The signal conditioning circuit 103 consists of a series connected sequence of circuits performing distinct operations on the input RF signal. The RF signal is applied to an attenuator 104 to appropriately adjust the amplitude of the signal to be commensurate with that of the phase shifted components introduced by the chirp characteristics of the laser 102. The RF signal applied to the laser 102 is appropriately pre-distorted by the use of a pre-distortion circuit 105, as is known in the prior art for modifying the RF signal applied to the laser to compensate for the nonlinear response of the laser affecting the signal at the remote receiver. Moreover, notwithstanding the improvements of the present invention to minimize distortion due to the dispersion introduced by the fiber, to the extent that the dispersive fiber link 113 still introduces some distortion into the signal received at the receiver 114, additional signal modifying circuitry can be employed in the pre-distortion circuit 105 to introduce a small compensating signal to cancel any such distortion still present at the receiver 114.

In particular, the amplitude of the phase modulated signal over the entire frequency range of the RF signal could vary as a function of the inverse of the RF frequency depending on the nature of the chirp. Thus, the compensating tilt circuit 106 will increase the gain of the applied RF signal to the phase modulator as a function of the inverse of the RF frequency so as to compensate for the non-linear response of the laser's phase modulation. This particular approach would apply in the case that the laser's chirp was "adiabatic". Adiabatic chirp means that the FM response of the laser is in phase with the AM response and constant with respect to the modulation frequency. From this one can deduce that the phase modulation response would vary as the inverse of the modulation frequency (since the frequency modulation behaves as the derivative of the phase modulation).

The output of the attenuator 104 is then connected to a tilt circuit 106. The frequency response of the amplifier over the entire frequency range of the broadband RF signal is not constant. This gain variation, sometimes called "tilt", may be compensated for by a compensating tilt circuit 106.

A tone generator 108 is provided to create a constant tone in the modulated optical signal for SBS (stimulated Brillouin scattering) suppression purposes. The output of the tone generator 108 is combined with the output of the phase delay circuit 107, and the combined RF signal is applied to the phase modulator 109. This RF combining must be done in such a way that unwanted phase delays or amplitude tilts are not introduced into the chirp cancellation path. The combined signal results in a phase modulation of the optical signal applied to the modulator 109 from the fiber connector 110, and more particularly to the cancellation of unwanted phase modulation components introduced by the laser 102.

The output of the modulator 109 is coupled over a fiber 111 to an amplifier 112, which is then connected to the optical link 113. At the remote end, the optical link 113 is connected to the receiver 114, which converts the received optical signal into an FR signal 115.

The phase modulator 109 of the present invention compensates for the nonlinear response of the laser 102, and/or for the distortion produced by the transmission of a frequency modulated optical signal through a dispersive fiber optic link as determined at the receiver end. The conditioning circuit 103 may be selectively adjustable to compensate for the distortion produced by the dispersive fiber optic link depending upon the length of the link, or may be factory set to a predetermined value to compensate for the distortion produced by the dispersive fiber optic link depending upon the length of the link. One such example of a length dependent dispersive effect would be self phase modulation (SPF).

Figure 3:
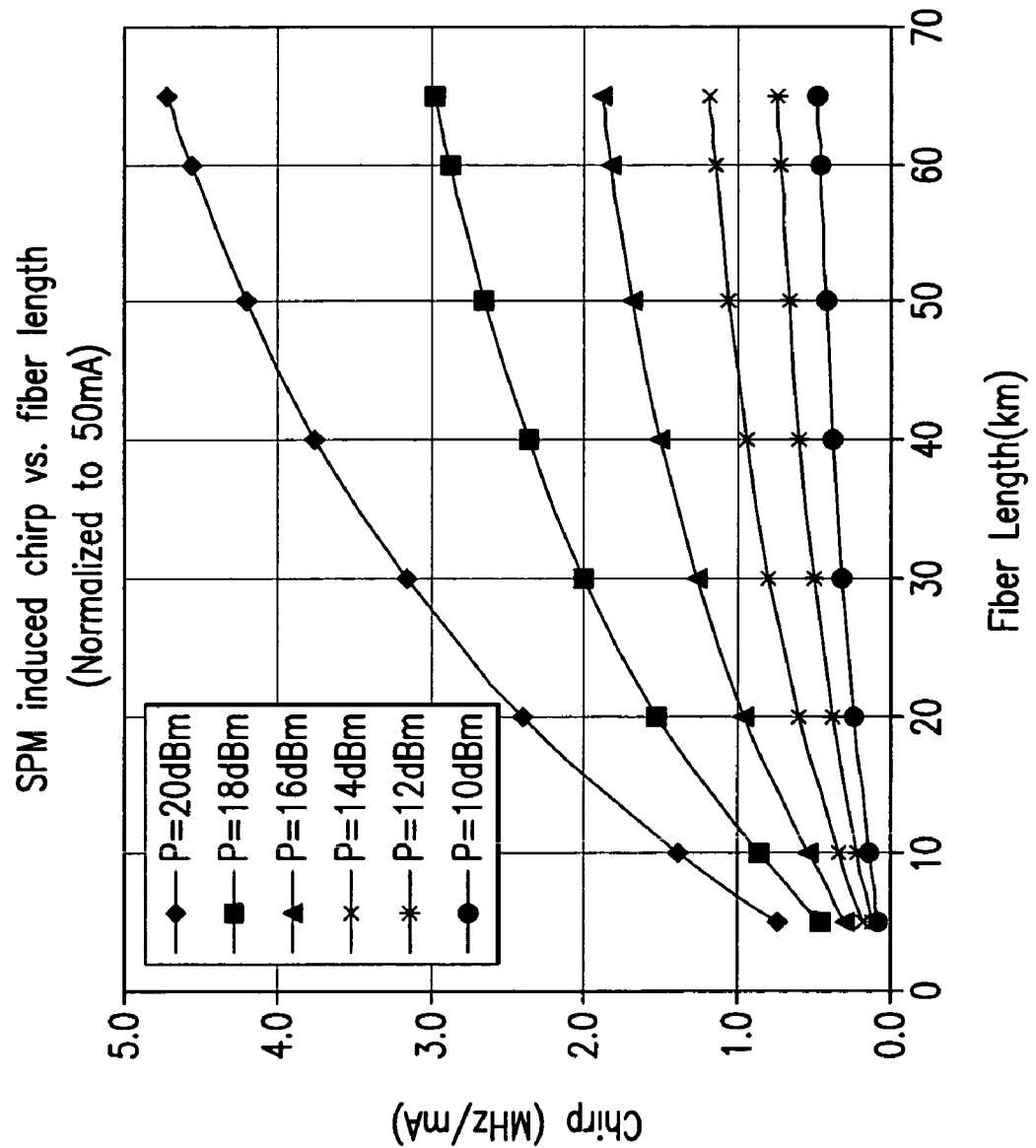
FIG. 3 is a graph depicting the effect of self-phase modulation chirp as a function of fiber length.

FIG. 3 is a graph depicting the effect of self-phase modulation induced chirp as a function of fiber length. The various curves represent different values of output power. The graph indicates that high power signals present the greatest change in induced chirp over fiber length.

Figure 4:
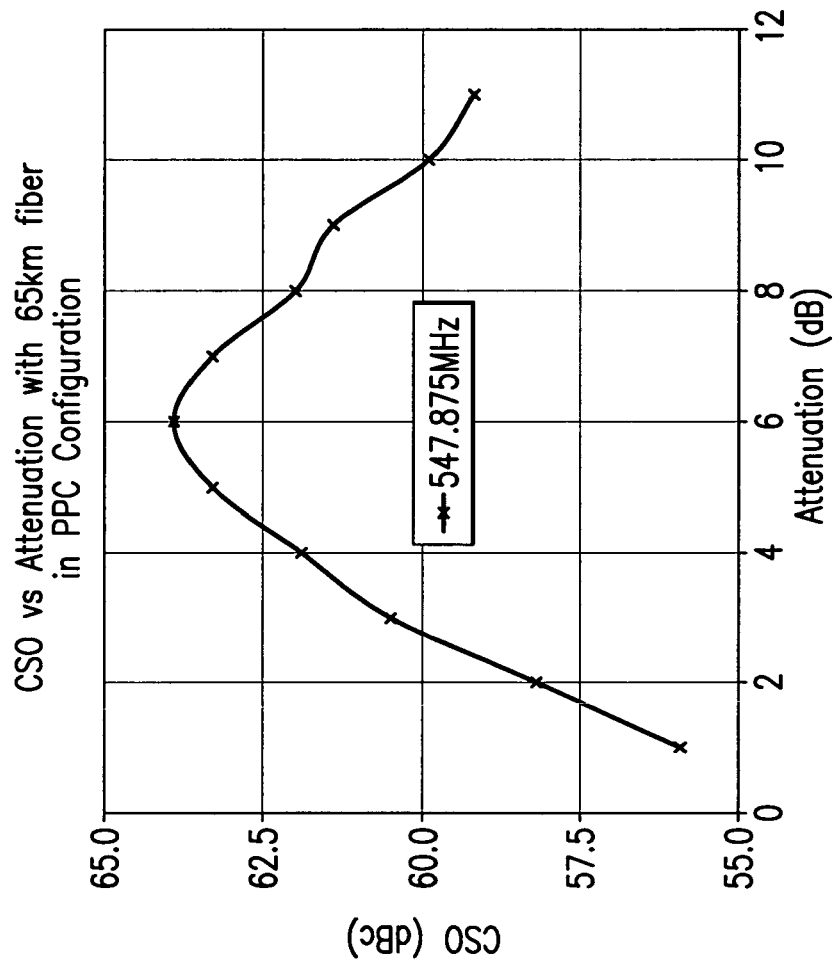
FIG. 4 is a graph depicting the amount of CSO versus attenuation under certain test conditions.

FIG. 4 is a graph depicting the amount of CSO versus attenuation under certain test conditions with the attenuation being adjusted with the element 104 shown in FIG. 2. In particular, a 65 km fiber is utilized in a PPC (post phase correction) configuration with 72 NTSC channels ranging from 115.25 MHz to 547.875 MHz. It is noted from the experimental data presented in the figure that the CSO is maximized at an attenuation setting equal to 6 dB. As a consequence, it is appropriate to adjust the phase delay circuit so that the phase is shifted by the amount so that the CSO is maximized.

Figure 5:
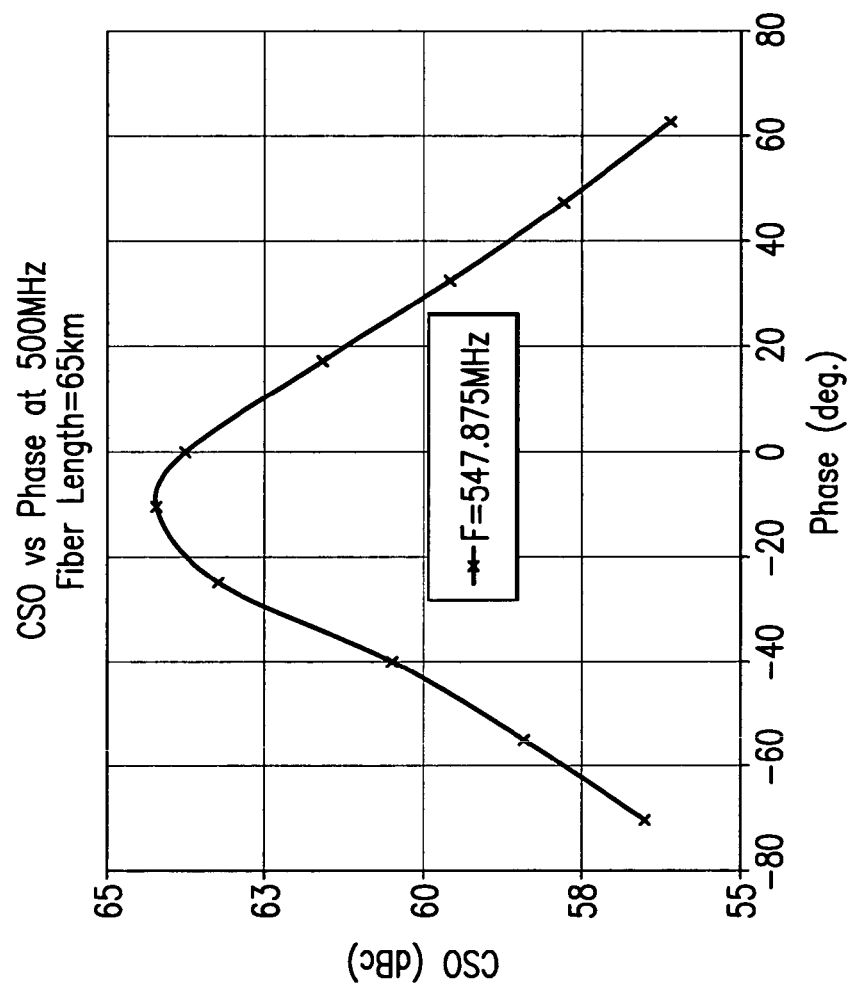
FIG. 5 is a graph depicting the amount of CSO versus phase under certain test conditions.

FIG. 5 is a graph depicting the amount of CSO versus phase under test conditions with the phase being adjusted with the element 107 shown in FIG. 2. In particular, a 65 km fiber is utilized in a PPC (post phase correction) configuration with 72 NTSC channels ranging from 115.25 MHz to 547.875 MHz. It is noted from the experimental data presented in the figure that the CSO is maximized at a phase setting between 0 and −10 degrees. As a consequence, it is appropriate to adjust the phase delay circuit so that the phase is shifted by the amount so that the CSO is maximized.

Many variations and modifications will be apparent to those skilled in the art without departing from the spirit and scope of the invention. For example, although described and illustrated in the context of a TV signal modulating a laser or light emitting diode, other nonlinear devices such as amplifiers may have inherent distortion largely cancelled by this technique. The fine adjustment of the relative phase of the signals in the primary and secondary paths is in the secondary path in the illustrated embodiment, but this could also be in the primary path with the coarse adjustment. The secondary path is preferred since such a delay in the primary path may have an inappropriate impedance for this path.

The present invention monitors the output of the laser with a photodiode, converts the signal in a control signal, which is coupled to a laser output monitor control circuit, including a negative feedback control circuit coupled to the temperature controller for adjusting the temperature of the laser in response to the output of the laser.

Various aspects of the techniques and apparatus of the present invention may be implemented in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

What is claimed is:

1. An optical transmitter for generating a modulated optical signal for transmission over a fiber optic link to a remote receiver comprising:
    a laser;
    an input coupled to the laser for directly amplitude modulating the laser with an analog RF signal to produce an output optical signal including an amplitude modulated information-containing component and phase noise;
    a phase modulator coupled to an output of the laser for separately modulating the output optical signal output from the laser in such a manner that distortion present in a received optical signal, received at the remote receiver, is reduced; and
    a delay circuit having an input coupled to the analog RF signal and an output coupled to the phase modulator to generate a modulating electrical signal synchronized with the output optical signal to cause the phase modulator to reduce the phase noise in the output optical signal.

2. A transmitter as defined in claim 1, wherein the phase modulator increases a stimulated Brillouin scattering threshold experienced by the received optical signal at the remote receiver.

3. A transmitter as defined in claim 1, wherein the laser is a semiconductor external cavity laser.

4. A transmitter as defined in claim 1 wherein a wavelength of the output optical signal is in the 1530 to 1570 nm range.

5. A transmitter as defined in claim 1, wherein the analog RF signal has a bandwidth greater than one octave and includes a plurality of distinct information carrying channels.

6. A transmitter as defined in claim 1, further comprising a pre-distortion circuit for modifying the analog RF signal applied to the input coupled to the laser to compensate for a nonlinear response of the laser affecting the received optical signal at the remote receiver.

7. A transmitter as defined in claim 1, wherein the modulation of the output of the laser is selectively adjustable to compensate for the distortion present in the received optical signal at the remote receiver.

8. A transmitter as defined in claim 1, wherein the delay circuit further includes a low frequency signal generator to increase the stimulated Brillouin scattering threshold experienced by the received optical signal at the remote receiver.

9. A transmitter as defined in claim 1, further comprising a tone generator circuit, wherein the delay circuit and the tone generator circuit are coupled to the phase modulator for adjusting a compensation applied by the phase modulator to the output of the laser to cancel the distortion in the received optical signal.

10. An optical transmitter for generating a modulated optical signal for transmission over a fiber optic link to a remote receiver, the transmitter comprising:
    an input for providing an RF signal;
    a laser coupled to receive the RF signal on the input and being directly modulated by the RF signal to produce an output optical signal, the output optical signal including an amplitude modulated information-containing component and a phase modulated component;
    an electro-optical element coupled to an output of the laser for reducing noise in the output optical signal and producing a modified optical signal coupled to the fiber optic link; and
    a biasing circuit coupled to the input to receive the RF signal and coupled to the electro-optical element to cause the electro-optical element to compensate for distortion in the received optical signal at the remote receiver,
    wherein the biasing circuit comprises a conditioning circuit comprising:
        an attenuator to adjust an amplitude of the RF signal propagating within the biasing circuit;
        a tilt circuit to adjust a frequency-dependent gain applied to the RF signal propagating within the biasing circuit; and
        a phase delay circuit.

11. The transmitter of claim 10, wherein the distortion in the received optical signal results from the phase modulated component from chirp produced by the laser.

12. The transmitter of claim 10, wherein the distortion in the received optical signal results from distortion introduced to the output optical signal by the fiber optic link and depends upon a length of the fiber optic link.

13. The transmitter of claim 12, wherein the biasing circuit comprises a tone generator coupled to the electro-optical element to compensate for the distortion that would be introduced by the fiber optic link on the output optical signal.

14. The transmitter of claim 10, wherein the electro-optical element comprises a phase modulator coupled to receive the output optical signal from the laser and to selectively adjust the output optical signal.

15. The transmitter of claim 10, wherein the conditioning circuit is selectively adjustable to compensate for distortion in the received optical signal at the remote receiver.

16. The transmitter of claim 10, wherein the electro-optical element is selectively adjustable to compensate for distortion in the received optical signal at the remote receiver.

17. A method of modulating an optical signal for transmission over a fiber optic link to a remote receiver, the method comprising:

applying an analog RF signal to a laser for directly amplitude modulating the laser to produce an output optical signal including an amplitude modulated information-containing component and a phase modulated component;

phase modulating the output optical signal with an electro-optical element in such a manner that distortion present in the receive optical signal, at the remote receiver, is reduced;

coupling a phase shifting circuit to an input providing the analog RF signal and in the phase shifting circuit adjusting an amplitude and/or a phase of a received portion of the analog RF signal to generate an adjusted received portion of the analog RF signal; and applying the adjusted received portion of the analog RF signal to the electro-optical element to compensate for distortion in the received optical signal at the remote receiver resulting from the output optical signal propagating through the fiber optic link, wherein adjusting the amplitude and/or the phase of the received portion of the analog RF signal in the phase shifting circuit comprises:

adjusting the amplitude of the received portion of the analog RF signal with an attenuator;

adjusting a frequency-dependent gain applied to the received portion of the analog RF signal with a tilt circuit; and adjusting a phase of the received portion of the analog RF signal with a phase delay circuit.

18. The method of claim 17, further comprising adjusting the amplitude and/or phase of the received portion of the analog RF signal, such that the electro-optical element compensates for distortion by canceling the phase modulated component.

19. The method of claim 17, further comprising:

in the phase shifting circuit, producing a low frequency signal; and combining the low frequency signal with the adjusted received portion of the analog RF signal and applying a combination to the electro-optical element to compensate for the distortion.

20. The method of claim 17, wherein the electro-optical element is a phase modulator.

21. The method of claim 17, wherein compensating for the distortion in the received optical signal at the remote receiver comprises selectively adjusting an amount of compensation applied by the electro-optical element to the output optical signal.

* * * * *